(12) United States Patent
Furbeck et al.

(10) Patent No.: US 9,792,573 B2
(45) Date of Patent: Oct. 17, 2017

(54) SYSTEM FOR MODELING PRODUCTION OF A PRODUCT

(71) Applicant: The Boeing Company, Huntington Beach, CA (US)

(72) Inventors: Warren Rees Furbeck, Mercer Island, WA (US); Scott D. Button, Seattle, WA (US); Richard Heitmeyer, Kirkland, WA (US); Thomas Edward Sherer, Everett, WA (US)

(73) Assignee: The Boeing Company, Chicago, IL (US)

(*) Notice: Subject to any disclaimer, the term of this patent is extended or adjusted under 35 U.S.C. 154(b) by 85 days.

(21) Appl. No.: 14/735,948

(22) Filed: Jun. 10, 2015

(65) Prior Publication Data

US 2015/0310359 A1 Oct. 29, 2015

Related U.S. Application Data

(63) Continuation-in-part of application No. 13/758,353, filed on Feb. 4, 2013, now Pat. No. 9,076,116.

(51) Int. Cl.
*G06Q 10/00* (2012.01)
*G06Q 10/06* (2012.01)
(Continued)

(52) U.S. Cl.
CPC ..... *G06Q 10/067* (2013.01); *G05B 19/41865* (2013.01); *G06Q 10/06* (2013.01);
(Continued)

(58) Field of Classification Search
None
See application file for complete search history.

(56) References Cited

U.S. PATENT DOCUMENTS 6,023,702 A * 2/2000 Leisten ................. G06Q 10/06
6,141,776 A 10/2000 Grose et al.
(Continued)

OTHER PUBLICATIONS

Leymann, Frank, and Dieter Roller. "Workflow-based applications." IBM Systems Journal 36.1 (1997): 102-123.*
(Continued)

*Primary Examiner* — Gurkanwaljit Singh
(74) *Attorney, Agent, or Firm* — Womble Carlyle Sandridge & Rice, LLP

(57) ABSTRACT

A method is provided that includes receiving process-related information describing a logical sequence of tasks to produce respective internal products of a process for production of a product. At least some of the tasks have a precedence relationship whereby the internal product produced by one task is an input utilized or required by another task. The method includes for at least some of the tasks, separating each of the at least some of the tasks into a closure portion that requires availability of the last input of its task before being initiated, and a distinct precursor portion capable of being initiated before the respective last input is available; and constructing a schedule for execution of the at least some of the tasks. Construction of the schedule includes temporally sequencing the closure portions of the respective tasks without intervening precursor portions, and prepending the precursor portions to respective, temporally-sequenced closure portions.

21 Claims, 10 Drawing Sheets

(51) Int. Cl.
*G06Q 50/04* (2012.01)
*G05B 19/418* (2006.01)
(52) U.S. Cl.
CPC ....... *G06Q 10/06316* (2013.01); *G06Q 50/04* (2013.01); *Y02P 90/30* (2015.11)

(56) References Cited

U.S. PATENT DOCUMENTS

| | | | |
|---|---|---|---|
| 6,332,163 B1* | 12/2001 | Bowman-Amuah | H04L 12/4604 709/217 |
| 6,473,794 B1* | 10/2002 | Guheen | H04L 41/22 709/223 |
| 6,523,027 B1* | 2/2003 | Underwood | G06F 9/465 |
| 6,718,353 B2 | 4/2004 | Hara et al. | |
| 6,718,535 B1* | 4/2004 | Underwood | G06F 9/4443 717/101 |
| 7,551,975 B2* | 6/2009 | Steinbach | G05B 19/41865 700/97 |
| 7,873,920 B2 | 1/2011 | Grose et al. | |
| 7,899,768 B2 | 3/2011 | Grose et al. | |
| 2003/0182052 A1* | 9/2003 | DeLorme | G01C 21/26 701/533 |
| 2004/0006566 A1* | 1/2004 | Taylor | G06Q 10/10 |
| 2004/0064351 A1* | 4/2004 | Mikurak | G06Q 10/087 705/22 |
| 2004/0107125 A1* | 6/2004 | Guheen | G06Q 99/00 705/319 |
| 2005/0243604 A1* | 11/2005 | Harken | G06F 8/51 365/185.22 |
| 2005/0251533 A1* | 11/2005 | Harken | G06F 17/2264 |
| 2006/0080338 A1* | 4/2006 | Seubert | G06Q 10/10 |
| 2006/0129970 A1 | 6/2006 | Haas et al. | |
| 2007/0067196 A1* | 3/2007 | Usui | G06Q 10/0631 705/7.12 |
| 2007/0106410 A1 | 5/2007 | Bouffiou et al. | |
| 2007/0150387 A1* | 6/2007 | Seubert | G06Q 10/10 705/31 |
| 2008/0154411 A1* | 6/2008 | Steinbach | G05B 19/41865 700/97 |
| 2008/0154412 A1* | 6/2008 | Steinbach | G05B 19/41865 700/97 |
| 2008/0154660 A1* | 6/2008 | Steinbach | G06Q 10/063 705/7.11 |
| 2008/0319719 A1 | 12/2008 | Grose et al. | |
| 2009/0069920 A1 | 3/2009 | Franzen et al. | |
| 2010/0004916 A1 | 1/2010 | Stauder et al. | |
| 2011/0022208 A1 | 1/2011 | Bouffiou et al. | |
| 2012/0050287 A1 | 3/2012 | Grose et al. | |
| 2012/0330869 A1* | 12/2012 | Durham | G06N 5/022 706/16 |
| 2013/0106682 A1* | 5/2013 | Davis | G06F 17/30967 345/156 |
| 2013/0185119 A1* | 7/2013 | Palao | G06Q 10/0637 705/7.36 |
| 2013/0246032 A1* | 9/2013 | El-Bakry | E21B 41/00 703/10 |

OTHER PUBLICATIONS

Georgakopoulos, Dimitrios, and Aphrodite Tsalgatidou. "Technology and tools for comprehensive business process lifecycle management." Workflow Management Systems and Interoperability. Springer Berlin Heidelberg, 1998. 356-395.*

Heindel, Lee E., and Vincent A. Kasten. "Next generation PC-based project management systems: the path forward." International Journal of Project Management 14.4 (1996): 249-253.*

Lee E Heindel, Vincent A Kasten, Next generation PC-based project management systems: implementation considerations, International Journal of Project Management, vol. 14, Issue 5, Oct. 1996, pp. 307-309, ISSN 0263-7863.*

Nakashima, Yusei, Noriaki Daito, and Satoru Fujita. "Integrated expert system with object-oriented database management system." Systems and computers in Japan 23.11 (1992): 29-40.*

Ludäscher, Bertram, et al. "Scientific process automation and workflow management." Scientific Data Management: Challenges, Existing Technology, and Deployment, Computational Science Series 230 (2009): 476-508.*

Stavness, Nicole Ann. Supporting flexible workflow processes with a progression model. Diss. University of Saskatchewan Saskatoon, 2005.*

Christ David, Theory of Constraints Project Management in Aircraft Assembly, Sep. 10, 2001. 26 pgs.

Newbold Rob, Scheduling for Success with Critical Chain, ProChain Solutions, Inc., Sep. 2010, 14 pgs.

Goldratt, Eliyahu M., "The Strategy & Tactic tree—Projects—Viable Vision implementations," Goldratt Consulting, 2008, http://public.wsc.edu/~engrmgmt/holt/em534/SandT-Projeds.pdf.

European Search Report for Application No. 14152519.6 dated Apr. 3, 2014.

Staveness, Nicole Ann, "Supporting Flexible Workflow Processes With a Progression Model," Diss. University of Saskatchewan Saskatoon, 2005.

Nakashima et al., :Integrated Expert System with Object-Oriented Database Management System, Systems and Computers in Japan, vol. 23, No. 11, 1992.

Georgakopoulos et al., "Technology and Tools for Comprehensive Business Process Lifecycle Management," Workflow Management Systems and Interoperability, springer-Verlag Benin Heidelberg, 1998.

Heindel et al., "Next Generation PC-based Project Management Systems: Implementation Considerations," International Journal of Project Management, vol. 14, No. 5, pp. 307-309, 1996.

Ludascher et al., "Scientific Process Automation and Workflow Management", Scientific Data Management: Challenges, Existing Technology, and Deployment, Computational Science Series 230 (2009): 476-508.

Leymann et al., "Workflow-based Applications," IBM Systems Journal, vol. 36, No. 1, 1997.

Heindel et al., "Next Generation PC-based Project Management Systems: The Path Forward" International Journal of Project Management, vol. 14, No. 4, pp. 249-253, 1996.

* cited by examiner

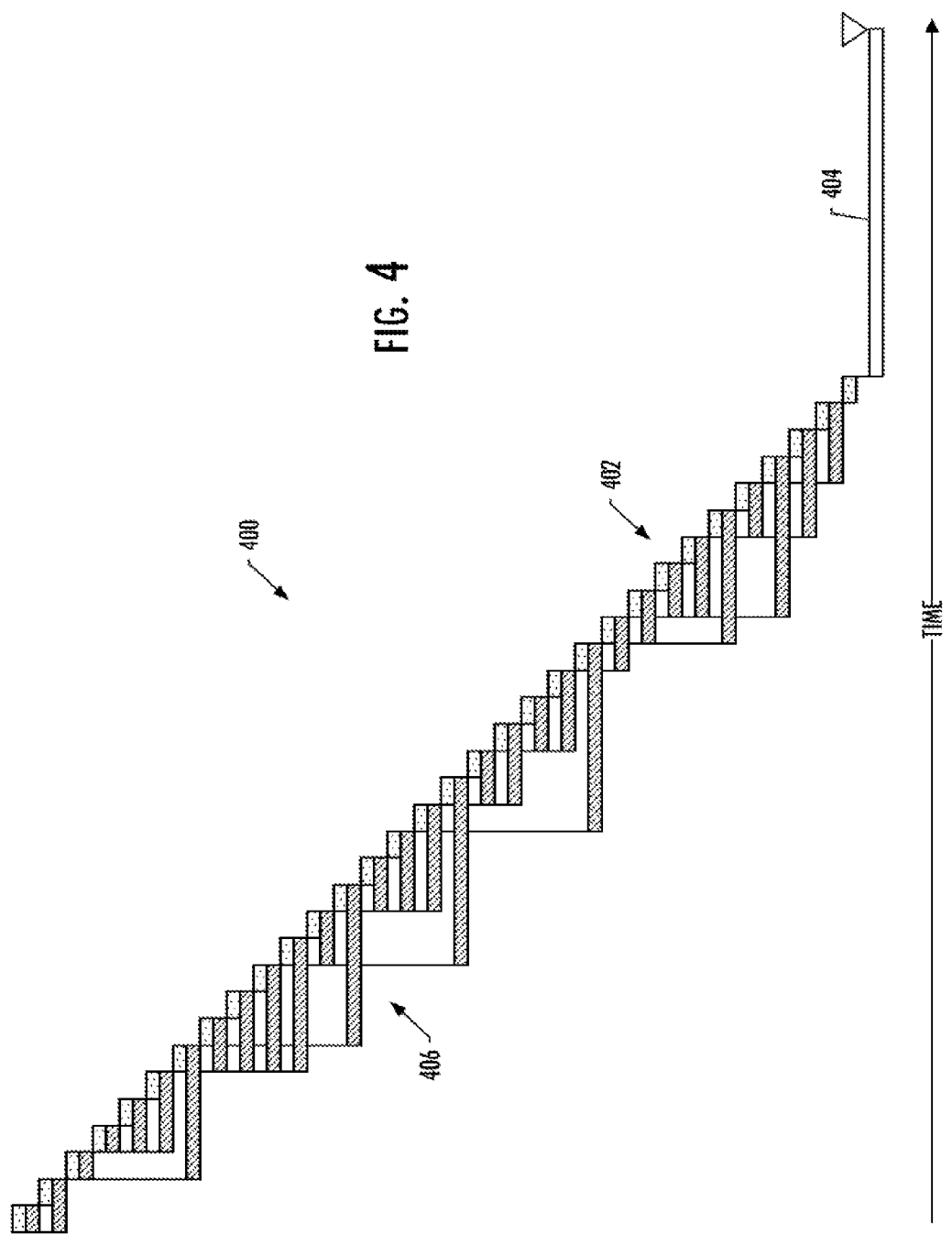

SYSTEM FOR MODELING PRODUCTION OF A PRODUCT

CROSS-REFERENCE TO RELATED APPLICATION(S)

The present application is a continuation-in-part of U.S. patent application Ser. No. 13/758,353, entitled: Alpha-Chain Constraints for Process Planning, filed on Feb. 4, 2013, the content of which is incorporated herein by reference in its entirety.

TECHNOLOGICAL FIELD

The present disclosure relates generally to process planning and, in particular, to providing a constraint basis for stochastic process planning models.

BACKGROUND

Complex projects such as the planning and production of large commercial or military aircraft require the scheduling and coordination of a plurality of resources. The resources to be coordinated may include materials, component parts, personnel, machinery and factory floor space, in addition to other resources. Integration and coordination are particularly important in complex projects since higher-order effects and interactions can adversely affect the cost of the project, the time required for completion of the project, and the risk of failure to deliver the required content. In addition, other variables of importance such as the overall efficiency of the project need to be modeled and measured.

A typical planning scenario may involve several functional roles. Subject matter experts (SMEs) speak for those resources that will be needed to provide deliverables in the plan. Resource managers (RMs) are responsible for coordinating and managing a set of resources. And general managers (GMs) or project managers (PMs) are responsible for achieving objectives by creating, committing resources, and managing plans. At the simpler end of the planning spectrum, all of these roles may be filled by the same person (e.g., "What am I going to make for dinner tonight?"). At the complex end of the planning spectrum, the roles may be filed by many individuals in many different organizational configurations. These relationships may change over a prolonged period of time and may involve contractual obligations and regulatory compliance at several levels.

A business case for a project may provide a framework for the planning activity, and it may include a time frame or required completion/delivery target, a budget for operating expense and acquisition of resources, and assumptions about the availability of constrained resources. For complicated or complex scenarios in highly-competitive environments, and where resources are commonly committed to multiple projects and or activities, conflicts between GMs, PMs, RMs and SMEs may be generated as a result of using traditional, schedule-based planning methods. The resulting representation of the plan is typically infeasible after GMs mandate that PMs create the plan within the business case, and GMs mandate that RMs and SMEs commit to the resulting schedule. Subsequently, the infeasible plan is typically managed by GMs insisting that PMs, RMs, and SMEs meet plan milestones without exceeding cost limits. At some point, reality diverges from the flawed plan in a way that can no longer be ignored, and the plan is reworked. Often, unplanned rework is required to correct problems that were created by the illusion of staying on schedule and under budget. These additional activities are usually at the high-cost end of a development process and may compromise or destroy the value of development programs.

The source of these poor results lies in the way activities are considered and put into a plan based on schedule and budget constraints. SMEs and RMs want to ensure that there will be enough resources (including budget) and enough time so that they can meet their commitments. So schedule durations from start-to-finish are considered as a basis for planning the use of resources.

Although existing process planning methods are useful, they nevertheless exhibit several drawbacks, at least in part due to their reliance on unsupportable schedule-based assumptions. Erroneous models that are used for planning and management produce erroneous decisions that are harmful to the purpose of an organization of resources.

Existing methods of process planning rely on discrete schedule estimates and task precedence relationships rather than the data-driven relationships in the network of deliverables. As such, they devolve into a schedule-based (as opposed to process-based) planning approach. Existing methods are also incapable of supporting the data-driven distinction between concurrent and serial activities. Conventional project management concepts require finish-to-start, finish-to-finish or start-to-start relationships between tasks. These relationships may be modified by applying a lead time to the relationships to account for overlapping (parallel) activity. But this approach relies on assumptions about schedule durations and lead time estimates that ignore the actual, data-driven relationships that govern parallel versus serial activity in a cross-functional environment.

It may therefore be desirable to have an apparatus and method that addresses these drawbacks, and improves upon existing practices.

BRIEF SUMMARY

To build better planning models for projects and in particular complicated and complex development projects, several considerations may be taken into account. One consideration may be a commonly-accepted, understandable construct, and another may be efficient use of resources in the creation of the models used for planning. Another consideration may be support for the integration of the needs of GMs, PMs, RMs and SMEs in the commitment of resources to the project. And yet another consideration may be the development of planning models that are robust with regard to sources of variation that affect projects (reducing if not eliminating planning and any re-planning as a source of unplanned rework).

In accordance with example implementations of the present disclosure, various tasks may be separated into multiple segments or portions based on the availability of necessary inputs. This may facilitate discrimination between a precursor portion of a task where parallel processing with other activities may be appropriate, and a closure portion of the task that follows the receipt of all necessary inputs. The closure portion may span the time and effort to produce an activity output after receipt of all necessary inputs. The precursor portion may span from the point in time when a particular input becomes available, which sometimes may be a key input that justifies putting resources to work on the activity, to the point in time when the last of the necessary inputs becomes available.

More particularly, example implementations of the present disclosure are directed to an improved apparatus, method and computer-readable storage medium for construction of a schedule for execution of tasks one or more of which has been separated into closure and precursor portions. The present disclosure thus includes, without limitation, the following example implementations. In some example implementations, a method is provided that includes receiving process-related information describing a process for production of a product, the process-related information describing a logical sequence of tasks to produce respective internal products of the process, at least some of the tasks having a precedence relationship whereby the internal product produced by one task is an input utilized or required by another task. For at least some of the tasks each of which utilizes or requires one or more inputs including temporally at least a last input, the method includes separating each of the at least some of the tasks into a closure portion that requires availability of the last input of its task before being initiated, and a distinct precursor portion capable of being initiated before the respective last input is available. Also for at least some of the tasks, the method includes constructing a schedule for execution of the at least some of the tasks. In this regard, construction of the schedule includes temporally sequencing the closure portions of the respective tasks without intervening precursor portions, and prepending the precursor portions to respective, temporally-sequenced closure portions.

In some example implementations of the method of the preceding or any subsequent example implementation, or any combination thereof, each of the tasks is composed of one or more activities, and for each of the at least some of the respective tasks separated into a closure portion and distinct precursor portion, each of the closure portion and precursor portion is composed of one or more activities of its task.

In some example implementations of the method of any preceding or any subsequent example implementation, or any combination thereof, the method further comprises calculating an average duration for the closure portions, the closure portions being temporally sequenced according to the calculated average duration.

In some example implementations of the method of any preceding or any subsequent example implementation, or any combination thereof, constructing the schedule includes constructing the schedule according to a critical path or critical chain algorithm.

In some example implementations of the method of any preceding or any subsequent example implementation, or any combination thereof, constructing the schedule includes constructing the schedule according to an alpha chain algorithm.

In some example implementations of the method of any preceding or any subsequent example implementation, or any combination thereof, the method further comprises compiling at least the process-related information and schedule into a plan model.

In some example implementations of the method of any preceding or any subsequent example implementation, or any combination thereof, the method further comprises constructing a multi-project schedule based on the plan model in which at least some of the tasks are spread across multiple projects in a multi-project environment, wherein constructing the multi-project schedule includes staggering at least some of the tasks based on resource constraints in the context of the process related information (e.g., a drum resource or virtual drum identifiable from the process-related information).

In some example implementations, an apparatus is provided for implementation of at least a schedule modeler. The apparatus comprises a processor and a memory storing executable instructions that in response to execution by the processor cause the apparatus to at least perform the method of any preceding example implementation, or any combination thereof. This may include implementation of subsystems of the schedule modeler, such as a task separator, duration calculator and/or schedule constructor, and perhaps also a plan modeler and/or multi-project scheduler, configured to perform steps of the method.

In some example implementations, a computer-readable storage medium is provided. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 4 illustrates one suitable Gantt chart for an alpha chain of tasks including closure portions and precursor portions, according to one example implementation;

DETAILED DESCRIPTION

Figure 1:
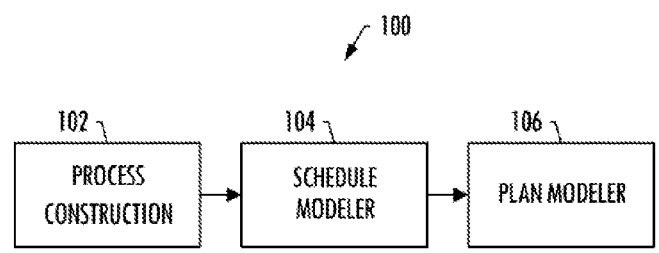
FIG. 1 illustrates a process-planning system in accordance with example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

As indicated above, example implementations of the present disclosure are directed to process planning and, in particular, to construction of a schedule for execution of tasks one or more of which has been separated into closure and precursor portions. Example implementations facilitate the exclusive use of finish-to-start relationships, while supporting the need to distinguish between work that can be done in parallel and work that must be done in serial. Using this approach may allow the modeling of plans such that PMs and RMs may see what is critical (via resource constraints or data relationships) and make appropriate decisions to produce the best results from the system of resources.

Through example implementations, the typical conflicts experienced between PMs and RMs over representations of the schedule may be dissolved, and the problems may be framed in a way that supports a collaborative approach to problem solving. Thus, the time and effort usually wasted in schedule conflicts may be more productively used to develop a resource feasible, achievable, integrated plan.

Example implementations also benefit in the capability to segment task uncertainty via the precursor and closure construct. Since most uncertainty may be captured in a task's precursor portion, estimates of duration for the closure portion that govern the program/project schedule may be made with higher confidence and without high-levels of "safety time" to protect the schedule from uncertainty and variation. This capability addresses many resource management and planning conflicts and facilitates resource management scenario planning within target time frames.

FIG. 1 illustrates a process-planning system 100 according to example implementations of the present disclosure. The system may include any of a number of different subsystems (each an individual system) for performing one or more functions or operations. As shown, for example, the system may include a process-construction system 102, schedule modeler 104 and/or plan modeler 106. The process-construction system may be generally configured to construct a process for production of a product. The schedule modeler may be generally configured to construct a process schedule according to a process such as that from the process-construction system. The plan modeler, then, may be configured to construct a plan model based on the process and its schedule. Although shown as part of the process-planning system, one or more of the process-construction system, schedule modeler and/or plan modeler may instead be separate from but in communication with the process-planning system. It should also be understood that one or more of the subsystems may function or operate as a separate system without regard to others of the subsystems. And further, it should be understood that the process-planning system may include one or more additional or alternative subsystems than those shown in FIG. 1.

As indicated above, the process-construction system 102 may be configured to construct a process for production of a product. A product, including physical products (e.g., objects) and non-physical products (e.g., information), may be described in terms of a hierarchical breakdown (hereinafter referred to as a "hierarchy") of the product's components. A "process" may be adapted to describe production of the product by defining tasks and precedences associated with the creation of each component. For example, the precedences may indicate that a particular task should be completed before another task is performed. In other terms, tasks may have a precedence relationship whereby an internal product (explained below) produced by one task is an input utilized or required by another task. In various examples, a task may refer to an activity or set of activities performed during creation of a component.

A complex process may include one or more sub-processes each of which may at times be considered a separate process without regard to the complex process or others of the sub-processes. In one example, the process constructed by the process-construction system 102 may be expressible as a network. The process-construction system may construct a suitable network in any of a number of different manners. In one example, the process-construction system may construct a feed-forward network in accordance with technologies described in U.S. Pat. No. 7,899,768, entitled: Methods and Systems for Constructing a Scalable Hierarchical Feed-Forward Model for Fabricating a Product, issued Mar. 1, 2011, the content of which is hereby incorporated by reference in its entirety. In one example, the process, and thus its network expression, may be adapted to maintain a feed-forward constraint such that no cycles or loops are contained within the process. The process and its network expression may also be scalable such that it may be combined with other processes to generate a larger process.

As used herein, a "product" may refer to something input into or produced by a process in the network. An illustrative process may be a commercial aircraft development process. In one example, a product of the commercial aircraft development process may include an aircraft or a part of the aircraft (e.g., fuselage section, wing, landing gear, engine, etc.). In another example, the product may include a type certificate or other relevant document related to legal use of the aircraft. In yet another example, the product may include a design specification or other dataset related to the design and/or construction of the aircraft. Some other examples of products may include a wing center section, a control column and wheel, an overhead stowage bin, a layout of passenger arrangement, front spar interface loads, pitching moment curves and the like.

The product may be either an "internal product" or an "external product." An internal product may be producible by one or more tasks in the network (the respective one or more tasks in various instances being considered a sub-process). In one example, an internal product may be considered a segment, which may be an internal product that is not a component of another internal product, but is instead intended to be broken into more detailed components. An internal product may receive as input an external product and/or an internal product. Some examples of internal products in the commercial aircraft development process may include avionics, propulsion systems, engine-specific fuel consumption curves and the like. Each internal product may include one or more "internal inputs," which may be utilized or needed to produce the internal product.

The internal inputs may include "internal components" and "component inputs." The internal components may refer to a subset of non-external inputs that is not part of the same segment as the internal product. The component inputs may refer to a subset of non-external inputs that is part of the same segment as the internal product. Each component input may include multiple "component products," the aggregate of which form the component input. An illustrative internal product may be a subassembly. For the subassembly, an example component input may be parts of the subassembly, and an example internal component may be a tool that assembles the parts to produce the subassembly. In this case, the parts assemble to form the subassembly. As such, the parts are considered in the same segment as the subassembly. In contrast, the tool that assembles the parts is not included within the subassembly. As such, the tool is considered as not part of the same segment as the subassembly.

The external product may be produced outside of a process in the network. In contrast to the internal product, input to the external product may not be represented in the context of the process or its network expression. Some examples of external products in the commercial aircraft development process may include regulatory requirements, customer requirements, company ground rules, existing facilities and the like. The external product may include multiple components, the aggregate of which forms the external product. Each such component forming the external product may be referred to herein as an "external component." The internal products, external products, internal components, component inputs and/or external components may form the set of inputs into a process adapted to produce any given internal product.

Each internal product may be a component. Each component may include multiple nested components, and may further include additional nested components at deeper levels of the hierarchy. In the commercial aircraft development process, some examples of segment components may include technology assessment, exploratory design, conceptual design, preliminary design, production system, infrastructure, detail manufacturing plans, vehicle product, product validation and the like. The example component "infrastructure" may include a nested component "production facilities," which further includes a nested component "major assemblies." The component "major assemblies" may include a nested component "wing center section," which further includes a nested component "upper panel." Additional nested components may continue from the component "upper panel."

As used herein, an "input" may refer to a product, such as an internal or external product, that may be utilized or required by the task to produce another product. That is, a statement that a first product is input to a second product may refer to the utilization or requirement of the first product by the task to produce the second product. For example, an internal product may be a design specification of an airplane wing. An external product may be specifications of fasteners that are utilized or required in the production of the detailed design. In this case, since the design specification of the airplane wing utilizes or requires the specifications of fasteners, the specifications of fasteners may also be referred to as an external input to the design specification of the airplane wing. According to some example implementations, an internal product can receive an input, but an external product cannot receive an input. Example technologies for selecting the inputs are described in the above-referenced and incorporated '768 patent.

The process constructed by the process-construction system 102 may be expressed by a network including one or more external products and two or more segments. In one example, as described in greater detail in the '768 patent for a feed-forward network, the process construction may include selection of one or more segments as final products of the process. At the segment level, the feed-forward network may be initialized by selection of other segments required for the production of a final segment as its input. Then, any input which does not violate the order of the feed-forward network may be specified, further augmenting the feed-forward network. If a segment requires only external products as inputs to produce its product, it may be an initial product. Establishment of a feed-forward network that connects initial products to final products and contains all segments of the network may be necessary to complete this, segment-level phase of the process construction. In various examples, new external products and segments that establish proper connection to the feed-forward network may be added. This may imply that all segments have at least one specified internal or external input.

Figure 2:
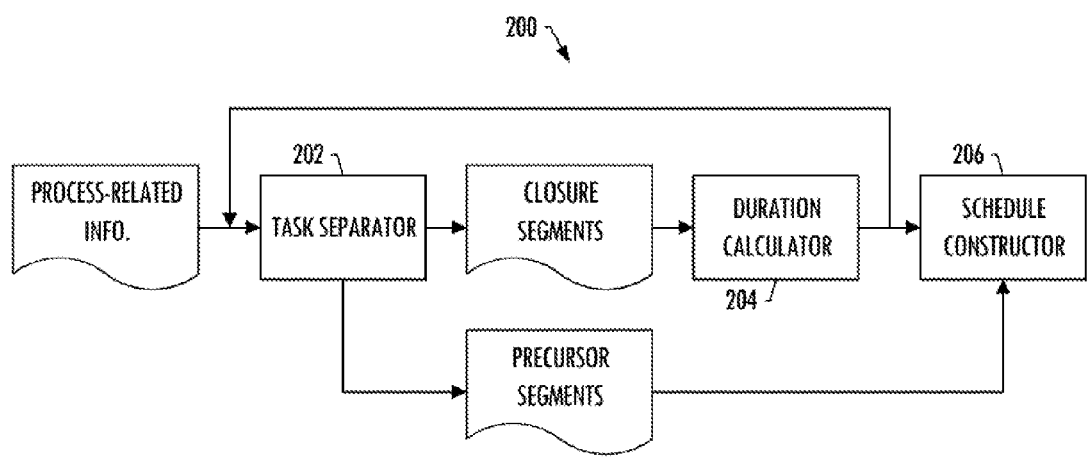
FIG. 2 illustrates one example of a schedule modeler in accordance with an example implementation.

The network that expresses a process such as that constructed by the process-construction system 102 may describe a logical sequence of tasks to produce internal products of the process. The schedule modeler 104 of the process-planning system 100, then, may be generally configured to construct a process schedule for execution of at least some of the tasks of the process. FIG. 2 illustrates a schedule modeler 200 that in one example may correspond to the schedule modeler 104 of FIG. 1. As shown, the schedule modeler 200 may be generally configured to receive process-related information for a process, such as from the process-construction system.

The process-related information received by the schedule modeler 200 generally may describe a particular process, such as may be expressed by a suitable network. As suggested above, the process-related information may describe the internal products, external products, internal components, component inputs and/or external components of the process. The process-related information may describe the tasks to produce the internal product, and precedence relationships between tasks (predecessors, successors). Even further, the process-related information may include task durations for the respective tasks to produce internal products of the process. The task duration may be represented in any of a number of different manners, such as by a single estimated value, some combination of multiple estimated values or a statistical quantity. In one example, task duration may be represented by a probability distribution.

The process of example implementations may be considered data driven in that execution of its tasks may depend on the existence or availability of their respective inputs. As indicated above, the task to produce an internal product may utilize or require one or more inputs, such as one or more internal products and/or external products. These inputs may be available at the same or different times, and temporally may include at least a last input. Some tasks require all of their inputs including the last input before they may be initiated, and must therefore be performed serially. Other tasks, however, may include one segment that requires availability of the last input before it may be initiated, but also include another segment that may be initiated before the last input is available. For these other tasks, the segment that requires availability of the last input must be performed serially, while the segment that does not require availability of the last input may be performed concurrently. For the avoidance of confusion with the aforementioned segments that may be internal products of a process, the segments of a task may at times be referred to as "portions" of the task.

A commercial aircraft development process may include, for example, the task to produce the detail part layout for a major assembly. The task may depend on the availability of inputs including, in the order in which they may be temporally available: internal-loads data, build-plan information, supplier information, tooling information, a major-assembly-integration layout, and interface loads and sizing data. In this example, the task may include a portion that requires availability of the last input (interface loads and sizing data) before it may be initiated, but also include another portion that may be initiated before the last input is available.

Figure 3A:
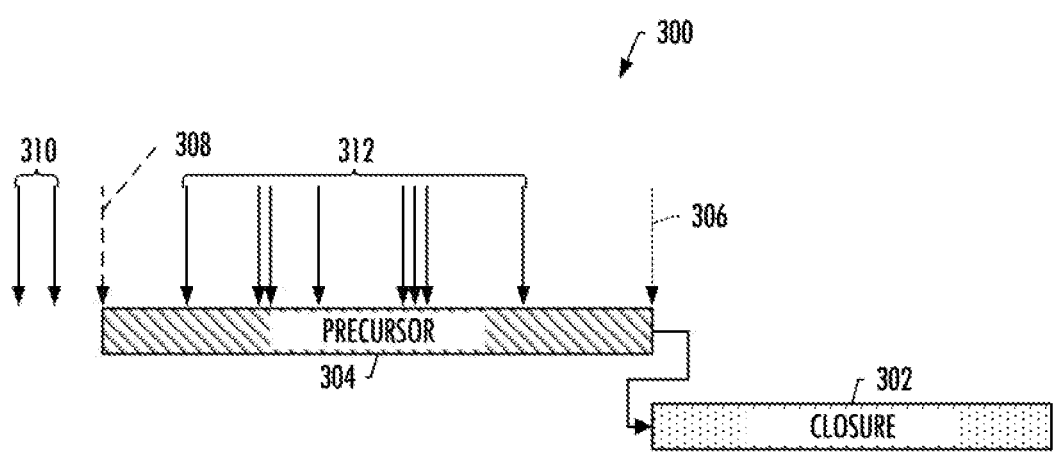
FIG. 3A illustrates a task including its precursor and closure portions and inputs to the respective portions.
Figure 3B:
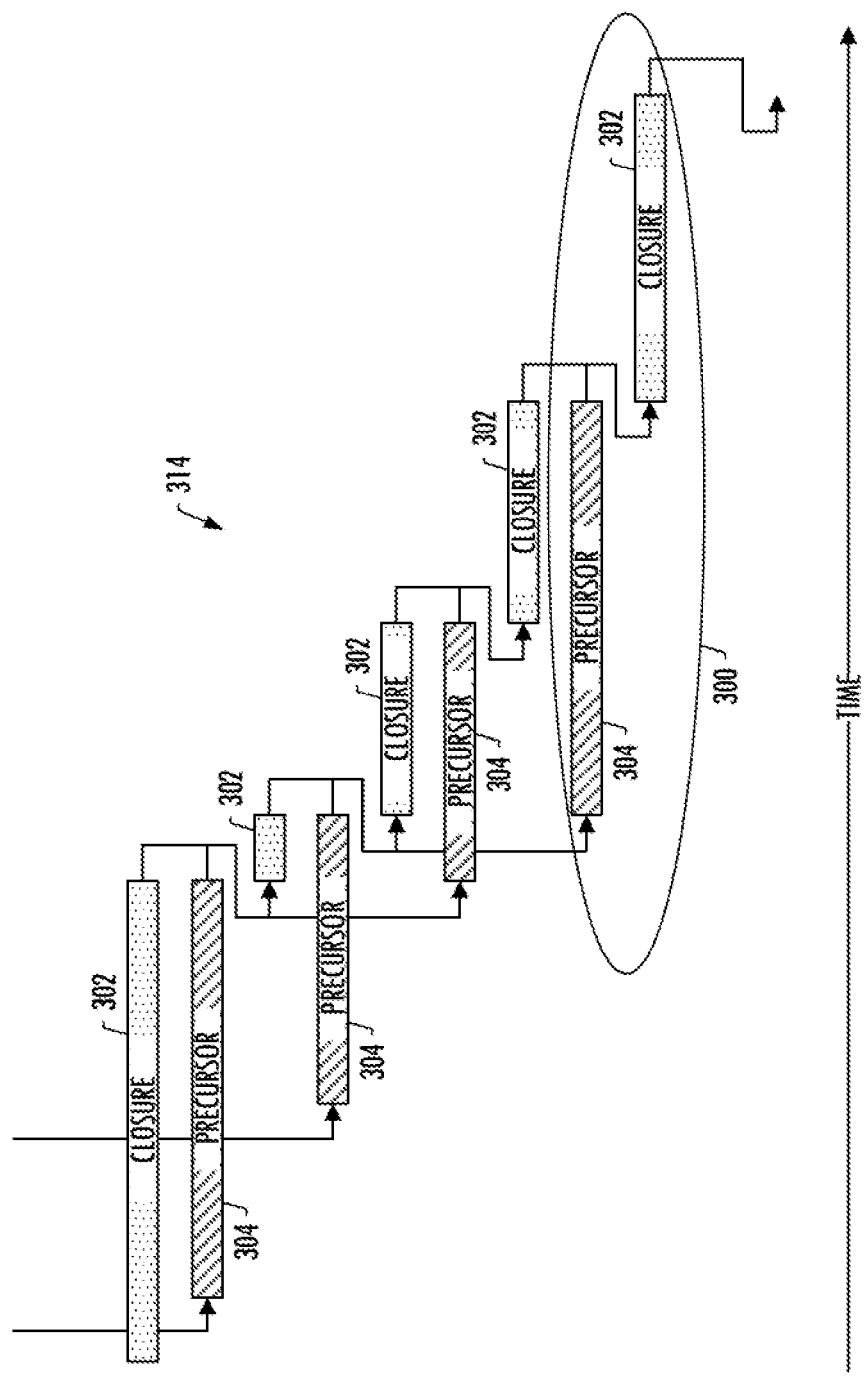
FIG. 3B illustrates a sequence of tasks and input dependencies between tasks' respective closure portions and precursor portions, according to one example implementation.

FIG. 3A illustrates a task 300 including a closure portion 302 and a precursor portion 304. The "closure" portion may be a portion of the task that requires the availability of the last input 306 of its task before being initiated, and must therefore be performed serially. The "precursor" portion on the other hand, may be a portion of a task capable of being initiated before the last input of its task is available, and may therefore be performed concurrently. A closure portion may therefore be initiated only when all of the task's inputs are available. A precursor portion may be initiated before all of the task's inputs are available. In one example, a precursor portion may be initiated when a first effective input 308 of its inputs is available, which temporally may or may not be the first input as there may be one or more earlier inputs 310, but is other than the last input to the task as there may be one or more inputs 312 between the first effective input and last input. In various examples, a closure portion or precursor portion may receive as inputs internal products produced by closure portions and/or precursor portions. Similarly, a closure portion or precursor portion may produce an internal product that may be input to closure portions and/or precursor portions. FIG. 3B illustrates a sequence 314 of tasks and input dependencies between its closure portions and precursor portions, according to one example implementation.

Generally, precursor portions may contain more uncertainty than closure portions. Accordingly, closure portions may be more representative of dependencies that govern progress of the process. In various example implementations, then, the schedule modeler 200 may schedule tasks based on their input dependencies, and may not require discrete dates or discrete task durations. As shown in FIG. 2, the schedule modeler may include a task separator 202 configured to separate each of one or more tasks to produce internal products of the process into distinct closure portions and precursor portions (some tasks may not include a distinct precursor portion). The task separator may then communicate the closure portions to a duration calculator 204.

As explained in greater detail below, a plan model may take into account resource-related information that describes resources and policy constraints on the process. In some examples, this may include RMs providing knowledge of levels of activity required for resources to execute the activities required for tasks, separated into precursor and closure portions. The duration calculator 204 may be configured to receive or calculate an average duration (given a defined level of resource support) for the closure portions. The separation of closure portions from precursor portions enables a schedule that has a short but feasible makespan.

SMEs have the experience and detailed understanding of the process to estimate man-hours of effort required to complete a particular task, given the scope of the task and an understanding of the inputs they will receive. RMs have an understanding of the number of units of the necessary skill available to estimate of the level of activity required. These and other participants may play a role in providing estimates of duration for the closure portions. Similar to task durations, closure-portion durations may be expressed as statistical quantities with known or even unknown probability distributions.

The schedule modeler 200 may further include a schedule constructor 206 configured to construct the process schedule based on the tasks, including closure and precursor portions, and based on the closure-portion average durations. The task separator 202 may communicate the closure and precursor portions to the schedule modeler; and the duration calculator 204 may communicate the closure-portion average durations.

The schedule constructor 206 may be configured to construct the process schedule in any of a number of different manners. In some examples, the schedule constructor may be configured to construct the process schedule according to a critical path or critical chain algorithm. In some examples, the schedule constructor may be configured to construct the process schedule according to an alpha chain algorithm, such as that described in greater detail in the above-cited and incorporated '353 application.

Critical path and critical chain algorithms to produce resource-constrained project models are well known to those skilled in the art of project management. These algorithms may be modified to account for tasks separated into respective precursor and closure portions while maintaining only finish-start precedence dependencies, such as by using the closure portions and their durations as a schedule model constraint. The precursor portions may span between their earliest input and the start of the closure portions of their respective tasks, such as using an appropriate "hammock" feature.

During construction of the process schedule, the schedule constructor 206 may sequence the closure portions according to their average durations, without intervening precursor portions. In various examples, this sequence of closure tasks may function as a constraint to a planning model for the process. To complete the schedule, however, the schedule constructor may prepend precursor portions to respective closure portions. These precursor portions may then be connected back to the closure portion of the task that produces their respective first effective inputs.

Returning to FIG. 1, in one example, the process schedule constructed by the schedule modeler 104 (e.g., schedule modeler 200) may be expressed as a Gantt chart or other similar chart or diagram. FIG. 4 illustrates one suitable Gantt chart 400 for at least some tasks of a process. As shown, the chart illustrates the tasks a sequence of closure portions 402 sized according to their calculated average duration, and an appended buffer 404. The chart also includes precursor portions 406 prepended to respective closure portions and connected back to the respective tasks that produce their respective first effective inputs. This may enable the schedule to account for the greater uncertainty in precursor portions relative to closure portions.

As also shown in FIG. 1, the process-planning system 100 may further include a plan modeler 106 configured to construct a plan model based on a process and its schedule. In one example, the process-construction system 102 may communicate process-related information (e.g., network) for a process to the plan modeler, and the schedule modeler 104 may communicate the process schedule to the plan modeler. The plan modeler then may compile the process-related information, plan schedule and any other appropriate information into a plan model. In one example, this other appropriate information may include resource-related information that describes resources and policy constraints on the process. Resource-related information may include, for example, manpower requirements and manpower availability, factory floor space availability, tooling requirements and/or any other resources required to execute the process. In various examples, the plan modeler may assign resources to execute the process, and may identify any potential conflicts or other issues that may arise during execution of the process. For example, the plan modeler may determine if a task requires a quantity of a particular resource greater than an amount that is currently available. In another example, the plan modeler may forecast a completion date for the process that exceeds its predetermined end date (e.g., milestone). These conflicts/issues may be communicated to appropriate personnel to facilitate their making decisions and taking various remedial actions.

The modeling approach of example implementations facilitates an integration framework that is based on data or deliverable dependencies. One example of how this may be exploited is the case where a supplier or sub-contractor requires a small sub-set of inputs to produce one or more work products for a prime-contractor responsible for overall product integration. Significant performance benefits may be realized in the overall process by trading contractual required dates for a requirement to provide a current evaluation of when the deliverable will be available. Models that are constructed using this approach may be more robust and to provide valuable information about the constraints that govern performance versus models that rely on schedule constraints.

Figure 5:
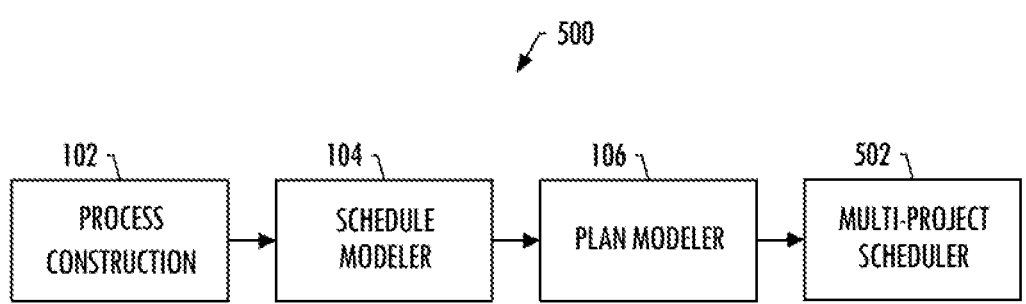
FIG. 5 illustrates a process-planning system in a multi-project environment, in accordance with one example implementation.

The process-planning system 100 may be particularly useful in single-project environments, but may also be useful in multi-project environments. FIG. 5 illustrates a process-planning system 500 in a multi-project environment, according to some example implementations. The process-planning system 500 of FIG. 5 is similar to that illustrated in FIG. 1, but may additionally include a multi-project scheduler 502 coupled to the plan modeler 106. The multi-project scheduler may be configured to construct a multi-project schedule based on the plan model in which the at least some of the tasks are spread across multiple projects in a multi-project environment. In some examples, this may include the multi-project scheduler being configured to stagger the at least some of the tasks (across the projects) based on a drum resource or virtual drum identifiable from the process-related information.

The drum resource or virtual drum is a mechanism that may be used to stagger the starts of the projects so that on average the resources have sufficient capacity to meet the project commitments. In some examples, the drum resource or virtual drum may be selected based on average loading and/or strategic considerations. More particularly, for example, the drum resource or virtual drum may be selected by calculating a percentage resource load over some long period of time, and sorting with the highest load at the top. In instances in which the load is highly variable with time, a virtual drum is used, such as an integration point contained by every project. Ultimately what may be used is some mechanism to stagger the project starts so that the resources are not overloaded.

In the multi-project environment, relative project priorities may be used as an input to prioritize the projects across the drum. Thus, multiple projects and the tasks of the multiple projects may be staggered based on the drum. This may be or include a process of building a "drum schedule" that staggers the drum engagement for each project so that the most heavily loaded resource has protective capacity. If this resource is not overloaded, all resources will have sufficient capacity on average. There may be intermittent periods of short term resource overload, which may be absorbed in appropriate buffers or absorbed by working overtime.

Figure 6:
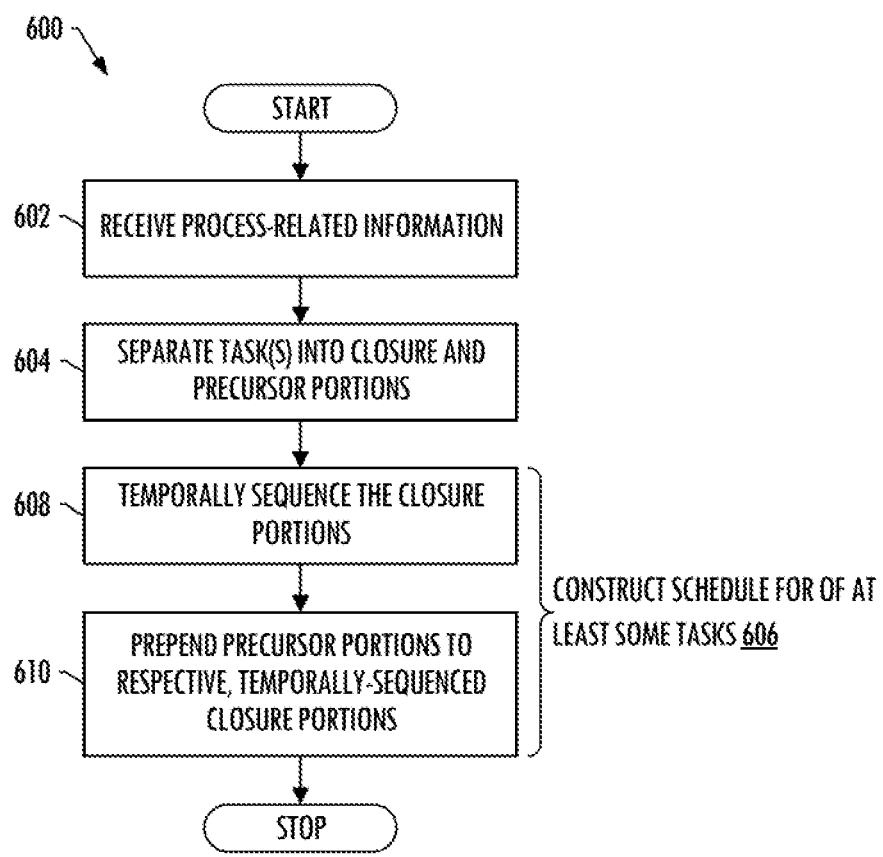
FIG. 6 is a flowchart illustrating various steps in a method according to some example implementations.

FIG. 6 is a flowchart illustrating various steps in a method 600 according to some example implementations of the present disclosure. As shown at block 602, the method may include receiving process-related information describing a process for production of a product. The process-related information may describe a logical sequence of tasks to produce respective internal products of the process, with at least some of the tasks having a precedence relationship whereby the internal product produced by one task is an input utilized or required by another task. For at least some of the tasks each of which utilizes or requires one or more inputs including temporally at least a last input, the method may include separating each of the at least some of the tasks into a closure portion that requires availability of the last input of its task before being initiated, and a distinct precursor portion capable of being initiated before the respective last input is available, as shown at block 604. Also for at least some of the tasks, the method may include constructing a schedule for execution of the at least some of the tasks, as shown at 606. This may include temporally sequencing the closure portions of the respective tasks without intervening precursor portions, and prepending the precursor portions to respective, temporally-sequenced closure portions, as shown at blocks 608, 610.

As suggested above, example implementations of the present disclosure may be applied to a number of project environments, from non-complex to complex single project environments, multi-project environments and the like. A number of different factors may distinguish environments considered non-complex from those considered complex, including the scale and complexity of the project network, the number of resources and organizations involved, the location of organizational boundaries versus work statement boundaries, and the degree of technical difficulty. Projects that in certain instances may be considered non-complex include, for example, construction of an addition on a house, conducting an instance of annual maintenance on a bridge, completing a small-scope research project and the like. On the other hand, projects that in certain instances may be considered complex include, for example, development of a commercial vehicle, such as an aircraft, satellite or ship, overhaul of a national health care system, development of an advanced combat system and the like.

Example implementations of the present disclosure may be further illustrated in different project environments in which they may be applied, including non-complex and complex single and multi-project environments. A single project environment may be characterized by resources dedicated to a single project, and a multi-project environment may be characterized by a pool of resources shared across a set of projects. For non-complex single and multi-project environments, tasks may be reasonably modeled with a non-hierarchical network. For complex single and multi-project environments, on the other hand, tasks may be more reasonably modeled with a scalable, hierarchical feed forward network, such as that described in U.S. Patent Application Publication No. 2014/0222487, entitled: Total-Ordering in Process Planning, the content of which is hereby incorporated by reference in its entirety.

Some example implementations in a non-complex single project or multi-project environment may involve modeling tasks with a non-hierarchical network. In a complex single project or multi-project environment, example implementations may involve modeling tasks with a scalable, hierarchical feed forward network. In any of these environments, then, example implementations may involve separation of at least some tasks into respective precursor and closure portions, and construction of a process schedule for execution of tasks according to a critical path or critical chain algorithm, or according to an alpha chain algorithm. In the multi-project environments, example implementations may further include construction of a multi-project schedule according to enterprise resource constraints.

Figure 7:
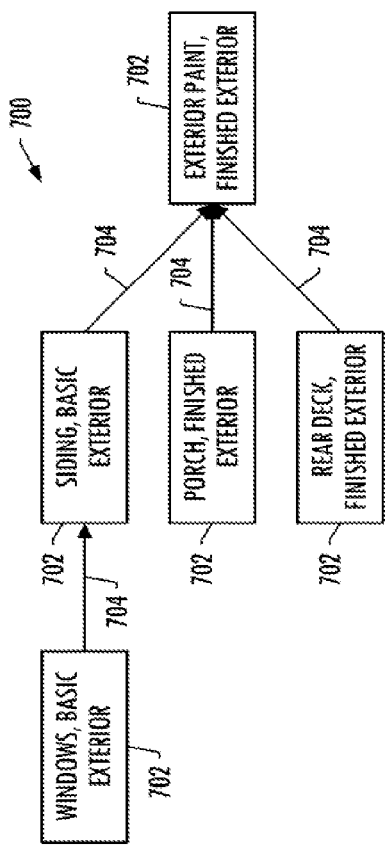
FIGS. 7-10 illustrate networks in accordance with example implementations.

FIG. 7 illustrates an example layout of a suitable network diagram 700 that may express at least a portion of a process constructed by the process-construction system 102 for a non-complex single project environment, and more particularly a house construction environment. More generally, standard network characteristics may be used in the layout to add meaning to displayed data. As shown, for example, the network includes a plurality of network nodes 702 that express respective tasks for production of products of the process. The nodes may be connected by edges 704 reflecting precedence relationships between the nodes, and correspondingly between the respective tasks of the process.

In the example shown in FIG. 7, windows are installed before siding, and siding, porch and rear deck are completed before exterior paint may be started. Conventional project management concepts require tasks to be related by finish-to-start, finish-to-finish, or start-to-start relationships. These relationships may be modified by applying a lead time to the relationships to account for overlapping (parallel) activity. The drawback of this approach is that it relies on assumptions about schedule durations and lead time estimates that ignore the actual, data-driven relationships that govern parallel vs. serial activity in a cross-functional environment. The precursor-closure construct of example implementations of the present disclosure, enables the ability to construct a project model using finish-to-start relationships while preserving the overlapping (parallel) portions of work.

Figure 8:
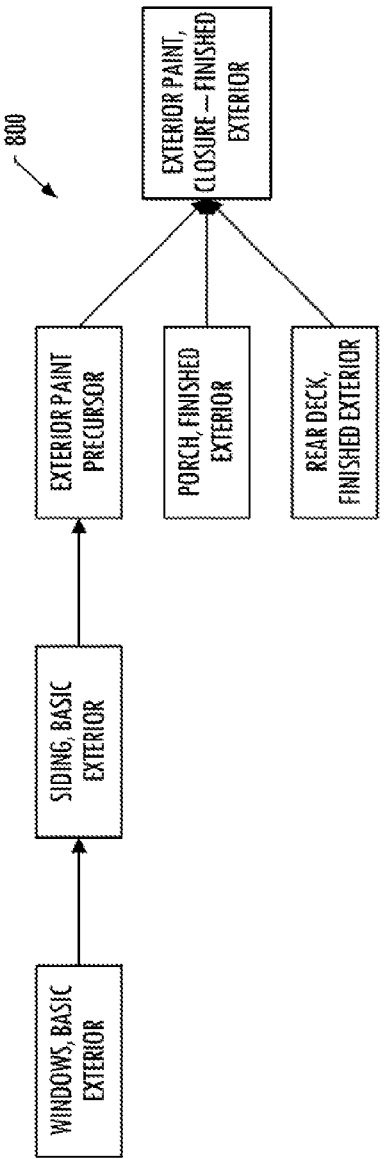

In the network 700 of FIG. 7, the following inputs may be needed in order to complete "Exterior Paint, Finished Exterior": "Siding, Basic Exterior" (that depends on "Windows, Basic Exterior"), "Porch, Finished Exterior" and "Rear Deck, Finished Exterior." On examining the needed inputs, it may be decided that once the windows and siding are complete, the Exterior Paint may be started, but it may not be completed until the Porch and Rear Deck are completed. In accordance with example implementations of the present disclosure, then, Exterior Paint may be separated into a precursor portion "Exterior Paint Precursor" with Siding, Basic Exterior as its input, and a closure portion with the following inputs: Exterior Paint Precursor, Porch, Finished Exterior and Rear Deck, Finished Exterior. FIG. 8 illustrates a network diagram 800 that illustrates this.

In a related non-complex multi-project environment, construction of the house may be one in a set of similar houses of a development. In the multi-project environment, the resources may be managed as a set of shared resources across the individual house projects.

Figure 9:
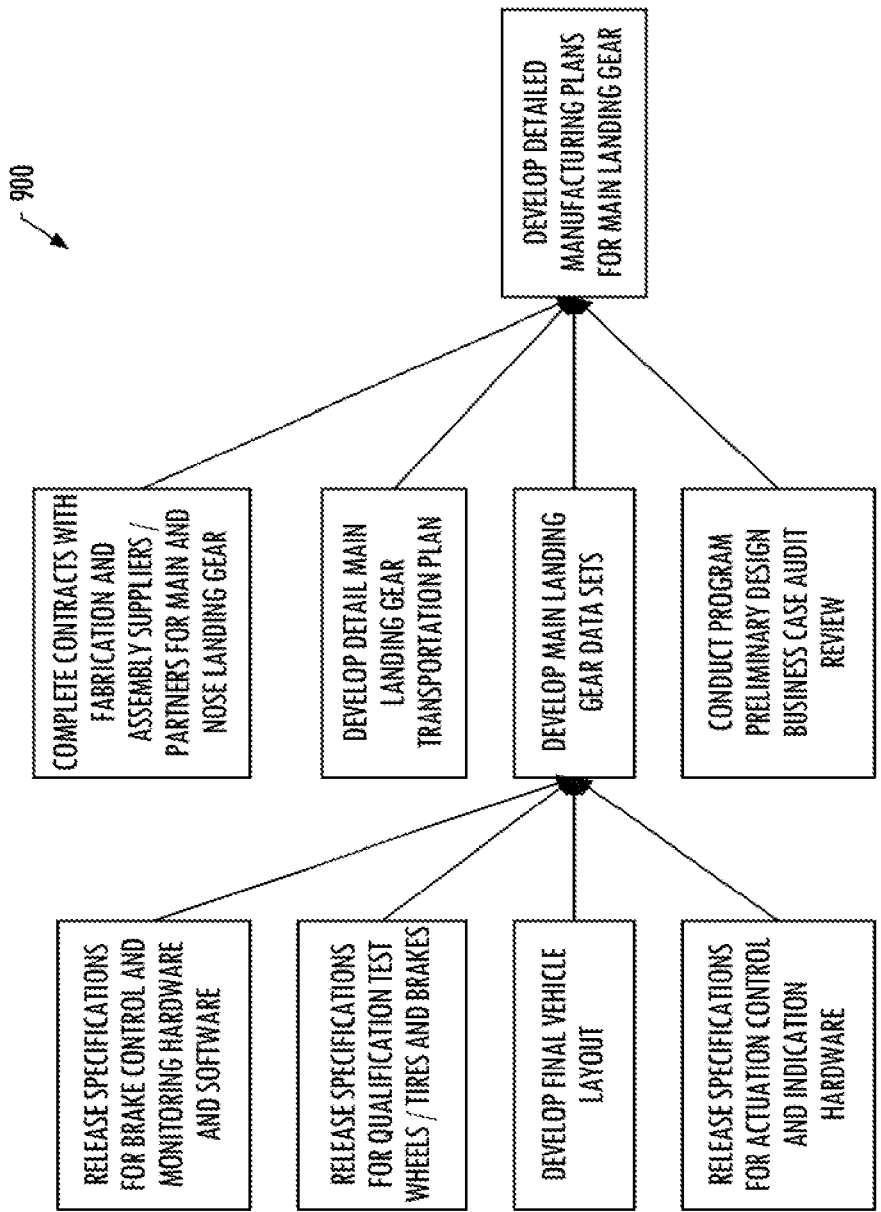
Figure 10:
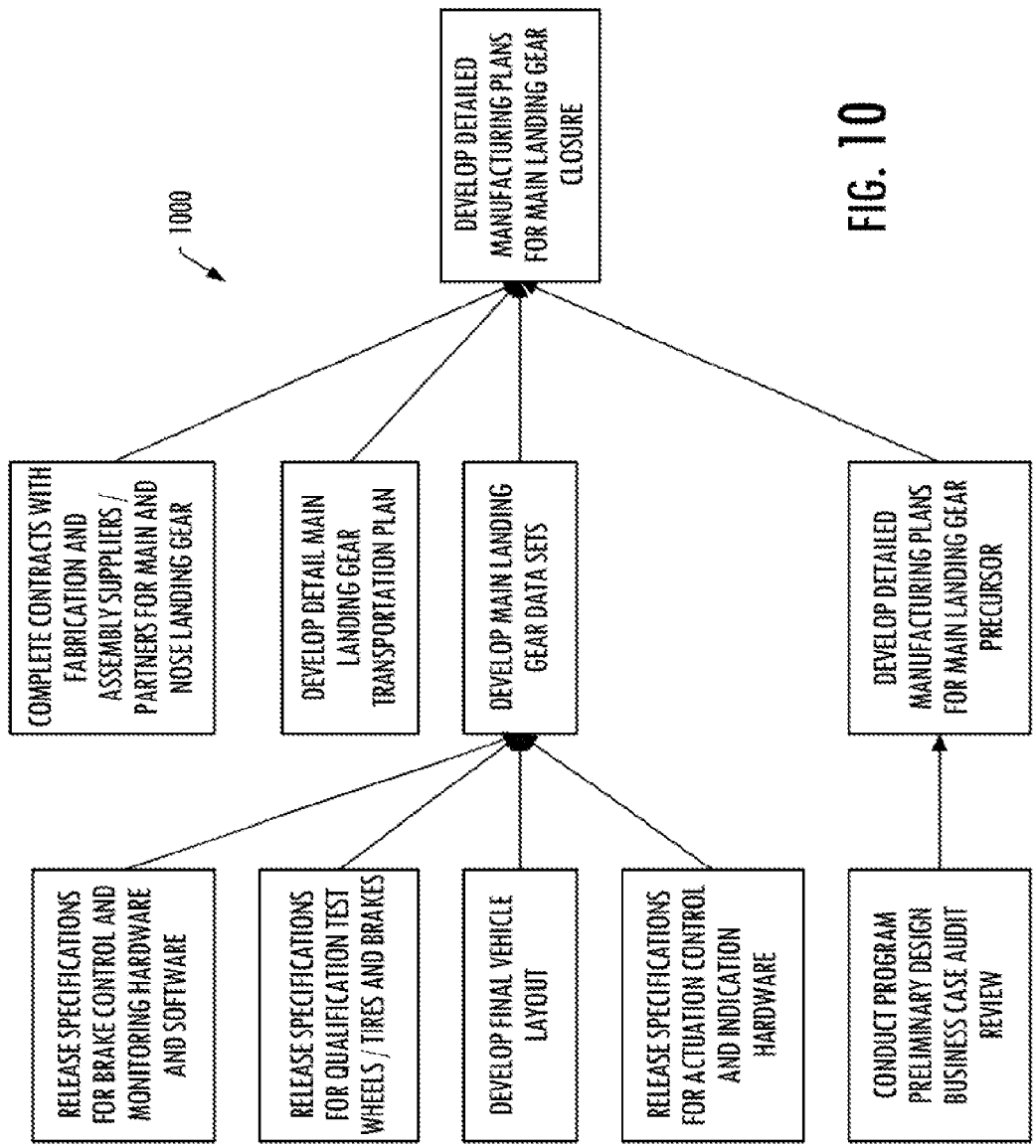

FIG. 9 illustrates an aircraft-specific example of a network diagram 900 for a main landing gear process in a complex single-project environment. In this example, three types of specifications and Final Vehicle Layouts are needed before Develop Main Landing Gear Data Sets may be started. Once Develop Main Landing Gear Data Sets is complete, along with three other inputs, Detailed Manufacturing Plans for Main Landing Gear may be started and completed. FIG. 10 illustrates a corresponding network diagram 1000 in accordance with the precursor-closure construct of example implementations, and in which the precursor for Detailed Manufacturing Plans may be started once the Preliminary Design Business Case Audit Review is complete. Once Develop Main Landing Gear Data Sets is completed, along with two other inputs as displayed in the graphic, Detailed Manufacturing Plans for Main Landing Gear may be started and completed.

In a complex multi-project environment, the main landing gear may be one in a set of similar gears that comprises a specific aircraft. The particulars of the network may be the same as in the single project environment, but resources may be managed as a set of shared resources across the individual landing gear projects. Further, there may be additional aircraft landing gear designs in the multi-project environment with resources shared across multiple development projects in overlapping time periods.

Some example implementations of the present disclosure may further provide analysis and strategic management of resource constraints, such as in a multi-project environment. In these example implementations, there may be a plan model for a number of active projects, and each project may have respective start and commitment dates. Any new projects may be placed into execution. As the start date arrives for each project, its budget may be released, inputs received and any appropriate taken to start the project. At one or more instances if not on a recurring basis, remaining duration estimates of the projects may be updated. If on a recurring or otherwise periodic basis, the update period may depend on the project duration, among other considerations.

Relative project priorities may be used as an input for managing execution of the projects. And in some examples, there may be further system or enterprise priorities taken into account. In instances in which multiple projects draw from a common pool of resources, a GM responsible for the projects and resources may establish clear priorities to be followed. As drum scheduling may resolve resource contention only for the drum resource, there may be instances of non-drum resource contention. In these instances, non-drum resource contention may be resolved by a prioritization policy that may use relative project priorities and possibly also enterprise priorities as input. These execution priorities may be managed according to run rules given to the projects' resources, and progress of the multiple projects may be reviewed to ensure adherence to the run rules.

In some example implementations, scenarios for different versions of schedule baselines and adjusted schedules reflecting different levels for resource constraints may be used for analysis and strategic management with the objective of improving the performance of projects or a system of resources for multiple projects. Through management of resource constraints, these constraints may be changed. Existing resources may be better utilized by changes in management policy. Resource levels may be elevated through additional investment or spending. These changes may be fed back to modify the RMs' knowledge of resource constraints.

According to example implementations of the present disclosure, the process-planning 100 and its subsystems including the process-construction system 102, schedule modeler 104 and/or plan modeler 106 may be implemented by various means. Similarly, the example schedule modeler 200 and its subsystems including the task separator 202, duration calculator 204 and schedule constructor 206 may be implemented by various means. Means for implementing the systems and their respective subsystems may include hardware, alone or under direction of one or more computer programs from a computer-readable storage medium. In some examples, one or more apparatuses may be configured to function as or otherwise implement the systems and their respective subsystems shown and described herein. In examples involving more than one apparatus, the respective apparatuses may be connected to or otherwise in communication with one another in a number of different manners, such as directly or indirectly via a wired or wireless network or the like.

Figure 11:
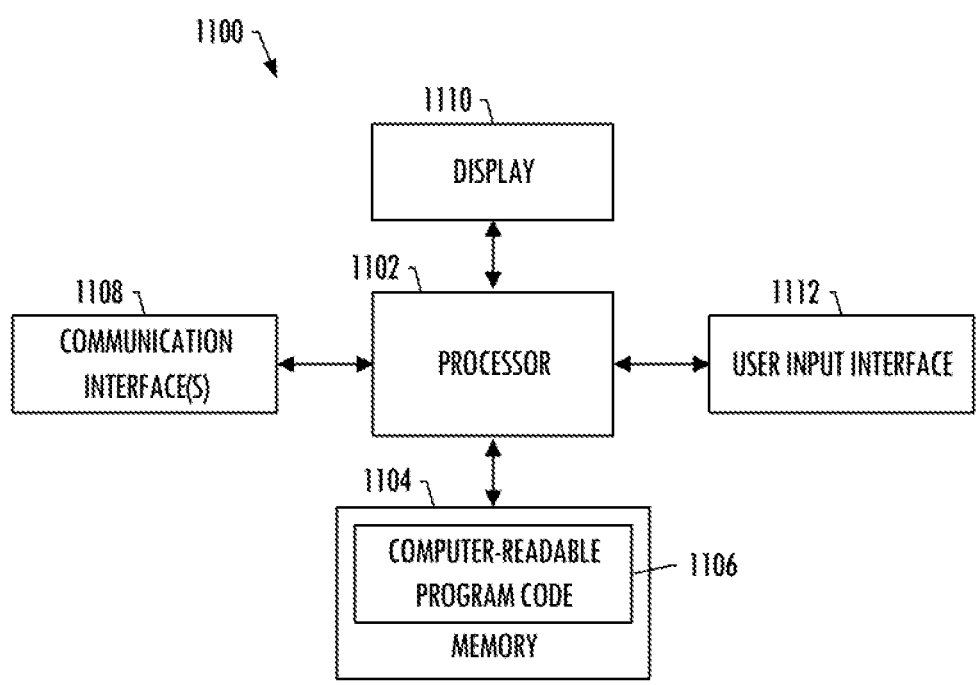
FIG. 11 illustrates an apparatus according to some example implementations.

FIG. 11 illustrates an apparatus 1100 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 1102 (e.g., processor unit) connected to a memory 1104 (e.g., storage device).

The processor 1102 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1104 (of the same or another apparatus).

The processor 1102 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 1104 is generally any piece of computer hardware that is capable of storing information such as, for example, data, computer programs (e.g., computer-readable program code 1106) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1104, the processor 1102 may also be connected to one or more interfaces for displaying, transmitting and/or receiving information. The interfaces may include a communications interface 1108 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1110 and/or one or more user input interfaces 1112 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together.

Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1100 may include a processor 1102 and a computer-readable storage medium or memory 1104 coupled to the processor, where the processor is configured to execute computer-readable program code 1106 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of at least a schedule modeler, the apparatus comprising:
    a processor; and
    a memory storing process-related information describing a process for production of a product, the process-related information describing a logical sequence of tasks to produce respective internal products of the process, at least some of the tasks having a precedence relationship whereby the internal product produced by one task is an input utilized or required by another task,
    wherein the memory further stores executable instructions that, in response to execution by the processor, cause the apparatus to implement at least:
    a task separator accessing the process-related information from the memory and, for at least some of the tasks each of which utilizes or requires one or more inputs including temporally at least a last input, separating each of the at least some of the tasks into a closure portion that requires availability of the last input of its task before being initiated, and a distinct precursor portion capable of being initiated before the respective last input is available; and
    a schedule constructor constructing a schedule for execution of the at least some of the tasks, including the schedule constructor at least:
    temporally sequencing the closure portions of the respective tasks without intervening precursor portions; and
    prepending the precursor portions to respective, temporally-sequenced closure portions.

2. The apparatus of claim 1, wherein each of the tasks is composed of one or more activities, and for each of the at least some of the respective tasks separated into a closure portion and distinct precursor portion, each of the closure portion and precursor portion is composed of one or more activities of its task.

3. The apparatus of claim 1, wherein the memory stores further executable instructions that, in response to execution by the processor, cause the apparatus to further implement: a duration calculator calculating an average duration for the closure portions, the schedule constructor temporally sequencing the closure portions according to the calculated average duration.

4. The apparatus of claim 1, wherein the schedule constructor constructing the schedule includes constructing the schedule according to a critical path or critical chain algorithm.

5. The apparatus of claim 1, wherein the schedule constructor constructing the schedule includes constructing the schedule according to an alpha chain algorithm.

6. The apparatus of claim 1, wherein the memory stores further executable instructions that, in response to execution by the processor, cause the apparatus to further implement: a plan modeler compiling at least the process-related information and schedule into a plan model.

7. The apparatus of claim 6, wherein the memory stores further executable instructions that, in response to execution by the processor, cause the apparatus to further implement:
    a multi-project scheduler constructing a multi-project schedule based on the plan model in which the at least some of the tasks are spread across multiple projects in a multi-project environment, wherein the multi-project scheduler constructing the multi-project schedule includes staggering the at least some of the tasks based on a drum resource or virtual drum identifiable from the process-related information.

8. A method comprising:
    storing, in a memory, process-related information describing a process for production of a product, the process-related information describing a logical sequence of tasks to produce respective internal products of the process, at least some of the tasks having a precedence relationship whereby the internal product produced by one task is an input utilized or required by another task; and by a processor accessing the process-related information from the memory,
    for at least some of the tasks each of which utilizes or requires one or more inputs including temporally at least a last input, separating each of the at least some of the tasks into a closure portion that requires availability of the last input of its task before being initiated, and a distinct precursor portion capable of being initiated before the respective last input is available; and
    constructing a schedule for execution of the at least some of the tasks, construction of the schedule including:
    temporally sequencing the closure portions of the respective tasks without intervening precursor portions; and
    prepending the precursor portions to respective, temporally-sequenced closure portions.

9. The method of claim 8, wherein each of the tasks is composed of one or more activities, and for each of the at least some of the respective tasks separated into a closure portion and distinct precursor portion, each of the closure portion and precursor portion is composed of one or more activities of its task.

10. The method of claim 8 further comprising: calculating an average duration for the closure portions, the closure portions being temporally sequenced according to the calculated average duration.

11. The method of claim 8, wherein constructing the schedule includes constructing the schedule according to a critical path or critical chain algorithm.

12. The method of claim 8, wherein constructing the schedule includes constructing the schedule according to an alpha chain algorithm.

13. The method of claim 8 further comprising: compiling at least the process-related information and schedule into a plan model.

14. The method of claim 13 further comprising:
constructing a multi-project schedule based on the plan model in which the at least some of the tasks are spread across multiple projects in a multi-project environment, wherein constructing the multi-project schedule includes staggering the at least some of the tasks based on a drum resource or virtual drum identifiable from the process-related information.

15. A computer-readable storage medium that is non-transitory and has computer-readable program code portions stored therein that, in response to execution by a processor, cause an apparatus to perform operations including at least:
accessing process-related information from a memory, the process-related information describing a process for production of a product, the process-related information describing a logical sequence of tasks to produce respective internal products of the process, at least some of the tasks having a precedence relationship whereby the internal product produced by one task is an input utilized or required by another task; and for at least some of the tasks each of which utilizes or requires one or more inputs including temporally at least a last input, separating each of the at least some of the tasks into a closure portion that requires availability of the last input of its task before being initiated, and a distinct precursor portion capable of being initiated before the respective last input is available; and
constructing a schedule for execution of the at least some of the tasks, including the at least:
temporally sequencing the closure portions of the respective tasks without intervening precursor portions; and
prepending the precursor portions to respective, temporally-sequenced closure portions.

16. The computer-readable storage medium of claim 15, wherein each of the tasks is composed of one or more activities, and for each of the at least some of the respective tasks separated into a closure portion and distinct precursor portion, each of the closure portion and precursor portion is composed of one or more activities of its task.

17. The computer-readable storage medium of claim 15, wherein the apparatus is caused to perform operations further including:
calculating an average duration for the closure portions, the apparatus being caused to temporally sequence the closure portions according to the calculated average duration.

18. The computer-readable storage medium of claim 15, wherein constructing the schedule includes constructing the schedule according to a critical path or critical chain algorithm.

19. The computer-readable storage medium of claim 15, wherein constructing the schedule includes constructing the schedule according to an alpha chain algorithm.

20. The computer-readable storage medium of claim 15, wherein the apparatus is caused to perform operations further including:
compiling at least the process-related information and schedule into a plan model.

21. The computer-readable storage medium of claim 20, wherein the apparatus is caused to perform operations further including:
constructing a multi-project schedule based on the plan model in which the at least some of the tasks are spread across multiple projects in a multi-project environment, wherein constructing the multi-project schedule includes staggering the at least some of the tasks based on a drum resource or virtual drum identifiable from the process-related information.

* * * * *